Dec. 4, 1951 H. A. STAMPER 2,577,283

CODE IDENTIFICATION SYSTEM

Filed Aug. 14, 1946

INVENTOR
H. A. STAMPER
BY E. Woodbury
ATTORNEY

Patented Dec. 4, 1951

2,577,283

UNITED STATES PATENT OFFICE 2,577,283

CODE IDENTIFICATION SYSTEM

Hamilton A. Stamper, Los Angeles, Calif., assignor to Bendix Aviation Corporation, South Bend, Ind., a corporation of Delaware Application August 14, 1946, Serial No. 690,460

6 Claims. (Cl. 177—353)

Figures 1, 2:
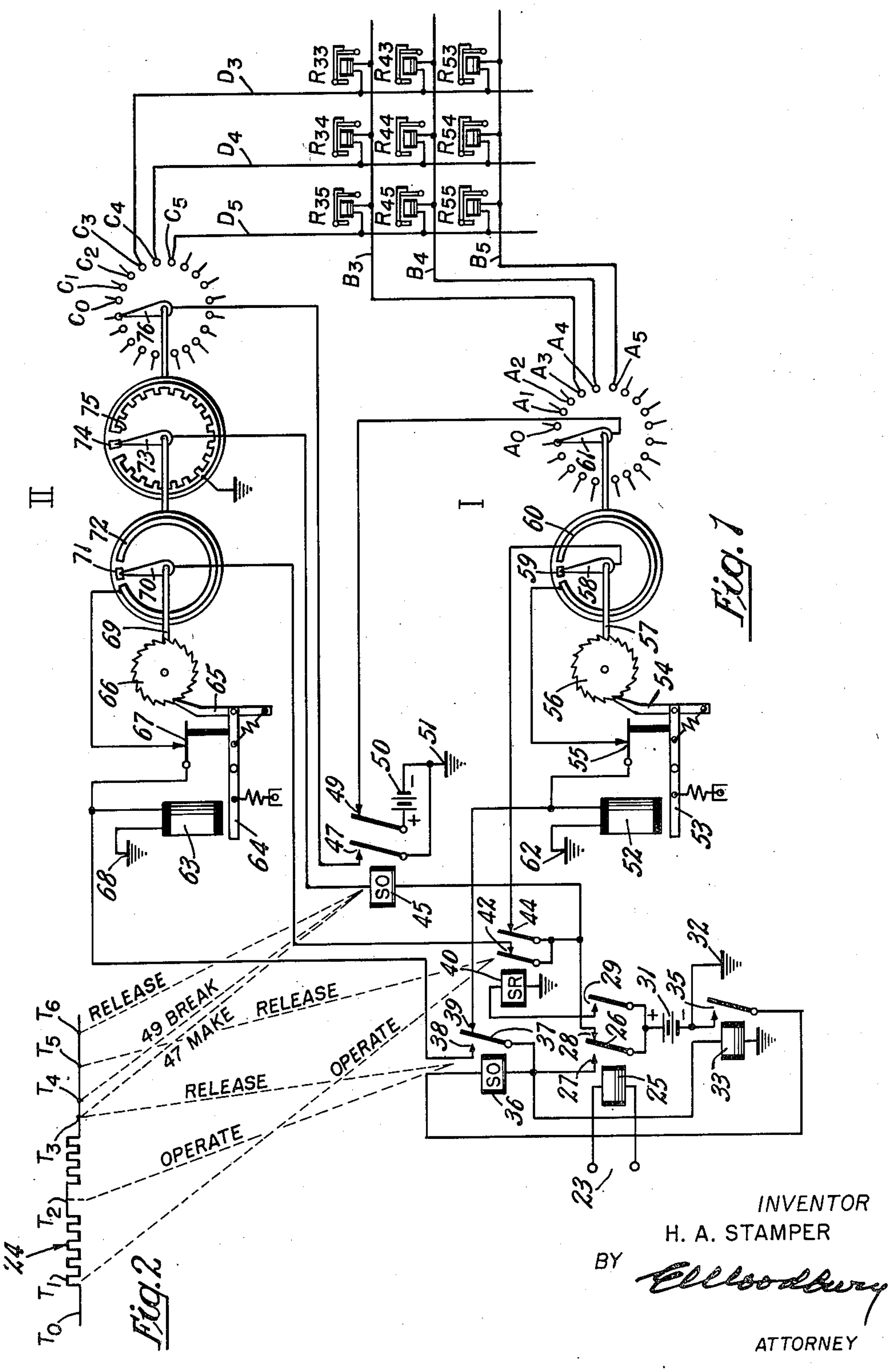

This invention relates to systems for selectively responding to code signals transmitted over communication channels of various types, and has particular utility in systems including in the communication channel a radio link or wire line that is exposed to extraneous interference.

An object of the invention is to provide a practicable and effective signaling system which selectively responds to a large number of different code signals.

Another object is to provide a selective code communication system that is relatively immune to interference.

Another object is to provide a selective code communication system having a large number of possible codes of reasonable length.

Other more specific objects and features of the invention will become apparent from the description of the invention to follow.

The present system utilizes a plurality of codes consisting of a variable number of dots followed by a dash which in turn is followed by a variable number of dots.

The number of different codes possible in such a system is equal to the product of the maximum number of dots preceding the dash and the maximum number of dots following the dash. Hence a larger number of codes is possible with a given maximum number of dots than is possible with codes consisting of a series of dots alone without a dash. In this connection I am aware that it is old to employ various numbers of dots, various numbers of dashes and various combinations of dots and dashes, one such system being the well known Morse code. The present system differs from the prior systems known to me in that it employs always only one dash interrupting a train of dots, from which a particular advantage results. This advantage is that the system cannot respond to any code that does not contain an intermediate dash, which makes the system relatively immune to interrupting signals. For instance, it is common for radio interference to produce a series of dots, but it is very rare for radio interference to produce two trains of dots separated by a dash.

A full understanding of the invention may be had from the following detailed description, with reference to the drawing, of a particular embodiment thereof.

In the drawing:

Fig. 1 is a schematic diagram illustrating a code-controlled system in accordance with the invention; and Fig 2 is a graph illustrating the operation of the system.

The drawing does not disclose the details of the receiving circuit, but it is to be understood that the system can be used in conjunction with a radio receiver or in conjunction with a line circuit. However, as previously indicated, the system is particularly adapted for use in radio reception, and it may be assumed that a remote radio station will transmit a modulated radio wave on a fixed frequency, which modulation will be coded and will consist of one or more dots preceding a dash and other dots following the dash. After the radio signal has been received and detected, it may appear as indicated by curve 24 in Fig 2 of the drawing. It will be observed that the particular code illustrated by the curve 24 consists of four dots followed by a long dash which in turn is followed by three more dots. During each dot or dash a potential above zero exists, whereas zero potential exists at all other times.

The code signals of the type illustrated in Fig. 2 are applied to the input terminals 23 (Fig. 1) which are connected directly to the winding of an impulse relay 25, this relay being of a fast action type which accurately follows the dots and dashes of the signal.

In Fig 1, the various elements of the system are shown in their normal positions when no signals are being received, in other words Fig. 1 shows the condition at time $T_0$ (Fig. 2) before reception of a code signal.

It will be observed that all of the relays and magnets of the system are deenergized under normal conditions.

Let it be assumed now that a signal corresponding to the curve 24 of Fig. 2 is applied to the input terminals 23. The impulse relay 25 follows the code rapidly and accurately to move its armature 26 away from the back contact 28 and close it on the contact 27 during each dot and dash, and also close its contacts 29.

The breaking of the armature 26 from its back contact 28 produces no effect, because at the time of starting all circuits connected to the back contact 28 are open at some other point. The closing of the armature 26 on the front contact 27 applies potential from the grounded battery 31 to one side of a slow-operating relay 36 and to a pulse-shortening relay 33. The return circuit to ground from the relay 36 is completed over the front contacts 35 of the relay 33, so that no current can flow through the winding of the relay 36 until the contacts 35 of relay 33 close. The purpose of this arrangement is to shorten the current pulses applied to the winding of the relay 36 in response to reception of dots and prevent the relay 36 from opening its armature 37 off its back contact 39 except in response to a long dash. To achieve this result, the relay 33 is so designed as to have a slightly slower action than the relay 25.

The operation of the impulse relay 25 in response to the initial series of dots applies current from the battery 31 over the armature 26 and front contact 27, and the armature 37 and the back contact 39 of the slow-operating relay 36, to the stepping magnet 52 of a selecting switch I, causing the magnet 52 to attract its armature 53 in response to each dot received and release its armature following each dot. Upon its release, the armature is retracted by its spring to actuate a ratchet wheel 56 one notch through a pawl 54. In response to the first dot received, the ratchet wheel 56, acting through the shaft 57, carries a rotary contact 58 off a dead contact 59 onto a long contact 60 and carries a rotary contact 61 onto a contact $A_0$. Succeeding impulses move the arms 58 and 61 through successive increments of motion to carry the arm 61 onto succeeding contacts $A_1$, $A_2$, $A_3$, etc. These contacts A are connected to horizontal lines B of a rectangular coordinate selection grid. In Fig. 1 only three horizontal conductors $B_3$, $B_4$, and $B_5$ are shown.

Whenever the impulse relay 25 is energized, its front contacts 29 are closed to connect the battery 31 to the winding of a slow release relay 40, which relay operates in response to the first dot at a time indicated as $T_1$ in Fig. 2, and remains operated for a substantial time thereafter because of its slow-release characteristics. The actuation of the relay 40 opens both its back contacts 42 and 44. The opening of contacts 44 renders the rotary contact 58 of the selecting switch I inactive, and the opening of contacts 42 likewise renders the similar rotary contact 70 of the selecting switch II inactive.

The impulse relay 25 applies battery over its front contact 27 and over the back contact 39 of the relay 36 to the stepping magnet 52 to actuate the latter in response to the series of dots constituting the first part of the code signal. As previously noted, the rotary contact 61 is actuated only in response to deenergization of the stepping magnet 52 so that it moves four steps in response to the four dots at the beginning of the signal represented by curve 24, thereby leaving the rotary contact 61 on the contact $A_3$ connected to the horizontal line $B_3$.

When the dash constituting the mid-portion of the code signal is applied to the terminals 23, the impulse relay 25 is held up long enough to energize the slow-operating relay 36, causing the latter to open its armature 37 off its back contact 39 and close it on its front contact 38, thereby opening the circuit to the stepping magnet 52 and completing a circuit to the stepping magnet 63 of the selecting switch II. As indicated in Fig. 2, this operation of the slow-operating relay 36 occurs during the reception of the dash.

Since the opening of the armature 37 off back contact 39 deenergizes the stepping magnet 52, the rotary contact 61 is again advanced one step. In other words, the contact 61 is moved one more step than there are dots in the initial part of the code signal. Should a signal be transmitted that has no dots ahead of the dash the rotary contact 61 would be advanced one step but this would merely position it on the contact $A_0$, which can be dead. A code containing one dot ahead of the dash would advance the rotary contact 61 two steps, so that the contacts $A_1$, $A_2$, $A_3$, etc., correspond to code signals containing one dot, two dots, three dots, etc., ahead of the dash.

At this time, potential is applied from a battery 50 over the back contacts 49 of the slow-operating relay 45 to the rotary contact 61, thence to the horizontal line $B_4$.

As has been previously indicated, both the impulse relay 25 and the slow-operating relay 36 are actuated by the dash of the signal, so that the stepping magnet 63 of the selecting switch II is pulled. At the end of the dash, the impulse relay 25 releases, thereby deenergizing the stepping magnet 63 and stepping the shaft 69 and the rotary contact 76 one step onto the contact $C_0$. The first of the series of dots following the dash again actuates the impulse relay 25 to energize and then deenergize the stepping magnet 63 to carry the rotary contact 76 onto the next contact. Therefore the signal shown in Fig. 2 having three dots following the dash actuates the rotary contact 76 onto the contact $C_3$ which is connected to the vertical conductor $D_3$ of the rectangular coordinate selector, but nothing occurs at this time because the circuit from the rotary contact 76 is open at the front contacts 47 of the slow-operating relay 45.

Following the transmission of the last dot of the code, the slow-operating relay 36 releases at the time indicated as $T_3$ in Fig. 2, such release however does not actuate any other portion of the apparatus because the armature 37 of this relay is energized only in response to actuation of the impulse relay 25.

The slow-operating relay 45 is energized following transmission of the last dot of the signal since it is connected to the battery 31 over the armature 26 and back contact 28 of the impulse relay 25. It will be recalled that this relay 45 is normally deenergized because its operated circuit is open at the dead contact 74 associated with the rotary contact 73 of the selecting switch II. However, at the time the impulse relay 25 releases following the transmission of the signal, the rotary contact 73 is out of normal position and is resting on one of the contacts 75 which are connected to ground, so that the relay 45 is energized and is actuated after an interval. As illustrated in Fig. 2, the relay 45 begins to pull at the time $T_3$ which happens to be the time at which the relay 36 releases, but this is merely incidental and is not necessary to the functioning of the system. The relay 45 is so designed that it closes its contacts 47 before it breaks its contacts 49. Thus, as shown in Fig. 2, it closes contacts 47 at time $T_3$ and breaks contacts 49 at time $T_4$. During the short time that both sets of contacts are closed, the selected horizontal and vertical conductors of the rectangular coordinate selection switch are simultaneously energized to energize a selected drop relay. Thus as has been previously described, the horizontal conductor $B_4$ is connected to battery over the contact $A_4$, the rotary contact 61 and the back contacts 49 of relay 45. Likewise during the interval mentioned the vertical conductor $D_3$ is connected over the contact $C_3$ and the rotary contact 76 over the contacts 47 of relay 45 to ground. This energizes the drop relay $R_{43}$ which is connected directly between the horizontal conductors $B_4$ and $D_3$, causing it to give a signal which remains until it is restored by an attendant despite the fact that the relay $R_{43}$ is immediately thereafter deenergized by opening of the contacts 49 of relay 45.

Following the operation of the slow-operating relay 45, the slow release relay 40 releases at the time $T_5$ in Fig. 2. This completes circuits from the battery 31 over the armature 26 and back contact 28 of relay 25 and through the back contacts 42 and 44 to the rotary contacts 70 and 58 of the selection switches II and I respectively. Current is applied from the rotary contact 70 and the segment 72 and through the homing contacts 67 to the stepping magnet 63 and over the rotary contact 58, homing contact 60 and homing contacts 55 to the stepping magnet 52, stepping both of the selection switches II and I back into their normal positions as shown in the drawing, in which positions the homing circuits are interrupted by movement of the rotary contacts 70 and 58 onto the insulated contacts 71 and 59 respectively.

The last operation to take place following receipt of a code signal is the release of the slow-operating relay 45 which occurs at the time $T_6$ in Fig. 2. The release of this relay produces no effect because at the time it occurs, the circuits including the contacts 47 and 49 are open at the rotary contacts 76 and 61 respectively.

It is to be understood of course that the relays R of the rectangular coordinate selection system are so adjusted that only the relay directly interconnecting the energized horizontal and vertical conductors is actuated.

It is important to note that the circuit from the battery 50 over the contacts of relay 45 to the selected horizontal and vertical conductors of the rectangular coordinate system is not completed until after the rotary contacts 61 and 76 have been set in response to the code signal, because it is only after the last dot of the code signal has been received and the rotary contact 73 has come to rest on one of the contacts 75 that the slow-operating relay 45 operates. Possibility of the relay 45 pulling prematurely is eliminated by virtue of the fact that when its energizing circuit is closed at the back contact 28, it is open at the rotary contact 73, and vice versa.

The particular type of system disclosed, operating on a code signal consisting of two trains of dots separated by a dash, is relatively immune to extraneous interference which may occur frequently in a radio system. Thus it is quite common to have interference in the form of impulses similar to dots, and therefore capable of giving a false indication in radio systems employing code signals consisting merely of a series of dots. The present system cannot be actuated by such interference, because it is impossible for the system to operate to energize any one of the relays R unless a code signal containing the intermediate dash is received. This is for the reason that the selecting switch II cannot be operated until the relay 36 is operated, and the latter relay is of the slow-operating type requiring a long dash for its actuation. Until the selection switch II has been operated, the relay 45 cannot function to complete the circuit to the rectangular coordinate selection system.

Another advantage of the code signal consisting of two series of dots separated by a dash is that it permits a very large number of different code signals without employing code signals of excessive length.

Although for the purpose of explaining the invention a particular system has been described in detail, various changes can be made without departing from the invention which is to be limited only to the extent set forth in the appended claims.

I claim:

1. A code responsive system for producing an indication in response to code signals transmitted over a communication channel exposed to extraneous interference, said system comprising: a first selector and a second selector, each selectively responsive to variable numbers of current dots to move out of a home position into a selected position, and selected means selectively responsive only to the setting by received impulses of both said first and second selectors; switching means for normally applying received current dots to said first selector but operable to direct received current dots to said second selector; and means responsive to a received current dash signal for operating said switching means, whereby a code signal consisting of first and second trains of current dots separated by a current dash sets said first selector in accordance with said first train of dots and sets said second selector in accordance with said second train of dots, to actuate said selected means; in which said means for operating said switching means comprises a slow-operating relay having an actuating winding, an impulse relay actuated by received dots and dashes, an auxiliary relay actuated by said impulse relay, and means responsive only to simultaneous actuation of both said impulse and said auxiliary relays for energizing said slow-operating relay during simultaneous operation of said impulse and said auxiliary relays.

2. A code responsive system for producing an indication in response to code signals transmitted over a communication channel exposed to extraneous interference, said system comprising: a first selector and a second selector, each selectively responsive to variable numbers of current dots to move out of a home position into a selected position, and selected means selectively responsive only to the setting by received impulses of both said first and second selectors; switching means for normally applying received current dots to said first selector but operable to direct received current dots to said second selector; and means responsive to a received current dash signal for operating said switching means, whereby a code signal consisting of first and second trains of current dots separated by a current dash sets said first selector in accordance with said first train of dots and sets said second selector in accordance with said second train of dots, to actuate said selected means; and means for preparing an energizing circuit to said selected means through said first selector, and means responsive to the setting of the second selector for first completing said energizing circuit through said second selector, and then interrupting said energizing circuit.

3. A code responsive system for producing an indication in response to code signals transmitted over a communication channel exposed to extraneous interference, said system comprising: a first selector and a second selector, each selectively responsive to variable numbers of current dots to move out of home position into a selected position, and selected means selectively responsive only to the setting by received impulses of both said first and second selectors; switching means for normally applying received current dots to said first selector but operable to direct received current dots to said second selector; and means responsive to a received current dash signal for operating said switching means, whereby a code signal consisting of first and second trains of current dots separated by a current dash sets said first selector in accordance with said first train of dots and sets said second selector in accordance with said second train of dots, to actuate said selected means; a slow-operating relay having contact means responsive to operation of the relay for first completing an energizing circuit to said selected means through said first and second selectors and then interrupting said energizing circuit; means for energizing said slow-operating relay to actuate said contact means comprising an impulse relay having rear contacts and responsive to received impulses; the operating circuit of said slow-operating relay including said rear contacts on said impulse relay and contacts on said second selector closed when said selector is at rest out of home position; and means for stepping said selector into home position in response to release of said impulse relay.

4. A system according to claim 3 in which said last-mentioned means comprises a slow release relay having rear contacts, stepping circuit means in said selectors responsive when energized to step said selectors into home position; circuit means including said rear contacts for energizing said stepping circuit means; and means including front contacts on said impulse relay for energizing said slow release relay.

5. A code responsive system for producing an indication in response to code signals transmitted over a communication channel exposed to extraneous interference, said system comprising: a first selector and a second selector, each selectively responsive to variable numbers of current dots to move out of a home position into a selected position, and selected means selectively responsive only to the setting by received impulses of both said first and second selectors; a switching means for normally applying received current dots to said first selector but operable to direct received current dots to said second selector; and means responsive to a received current dash signal for operating said switching means, whereby a code signal consisting of first and second trains of current dots separated by a current dash sets said first selector in accordance with said first train of dots and sets said second selector in accordance with a second train of dots, to actuate said selected means; said means responsive to a received current dash signal comprising a slow-operating relay having an armature and front and back contacts constituting said switching means; an impulse relay responsive to received impulses; and means including a source of current and front contacts on said impulse relay for applying current to said slow-operating relay.

6. A system according to claim 5 in which said last-mentioned means includes an auxiliary relay having an energizing circuit including said front contacts of said impulse relay, said auxiliary relay having front contacts in the energizing circuit of said slow operate relay.

HAMILTON A. STAMPER.

REFERENCES CITED

The following references are of record in the file of this patent:

UNITED STATES PATENTS

| Number | Name | Date |
|---|---|---|
| 853,888 | Leake | May 14, 1907 |
| 1,331,151 | Hopkins | Feb. 17, 1920 |
| 1,867,209 | Chauveau | July 12, 1932 |
| 1,963,600 | Voss | June 19, 1934 |